United States Patent
Hart et al.

(10) Patent No.: US 11,621,798 B2
(45) Date of Patent: Apr. 4, 2023

(54) SIGNALING OF PREAMBLE PUNCTURING CONFIGURATION IN A NON-HIGH THROUGHPUT RTS/CTS EXCHANGE

(71) Applicant: Cisco Technology, Inc., San Jose, CA (US)

(72) Inventors: Brian Hart, Sunnyvale, CA (US); Zhigang Gao, Twinsburg, OH (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/389,824

(22) Filed: Jul. 30, 2021

(65) Prior Publication Data
US 2022/0247515 A1   Aug. 4, 2022

Related U.S. Application Data

(60) Provisional application No. 63/144,632, filed on Feb. 2, 2021, provisional application No. 63/147,881, filed on Feb. 10, 2021.

(51) Int. Cl.
  *H04L 1/00*   (2006.01)
(52) U.S. Cl.
  CPC ................... *H04L 1/0068* (2013.01)
(58) Field of Classification Search
  CPC ... H04L 1/0068; H04L 12/4604; H04L 45/74; H04L 69/22; H04W 84/04
  See application file for complete search history.

(56) References Cited

U.S. PATENT DOCUMENTS

| | | | |
|---|---|---|---|
| 8,873,384 B2 | 10/2014 | Hart et al. | |
| 2012/0106426 A1 | 5/2012 | Hart et al. | |
| 2014/0079016 A1* | 3/2014 | Dai | H04L 5/0041 370/329 |
| 2015/0160997 A1* | 6/2015 | Zhang | H03M 13/11 714/758 |
| 2016/0050093 A1* | 2/2016 | Choi | H04L 5/0007 375/308 |
| 2016/0191665 A1* | 6/2016 | Kang | G06F 3/067 709/205 |
| 2018/0213568 A1 | 7/2018 | Gong et al. | |
| 2019/0313412 A1* | 10/2019 | Baldemair | H04W 72/0453 |
| 2020/0083983 A1* | 3/2020 | Chen | H04L 1/0068 |
| 2020/0145139 A1* | 5/2020 | Merlin | H04L 1/1812 |
| 2021/0014811 A1 | 1/2021 | Seok et al. | |
| 2021/0105667 A1 | 4/2021 | Li et al. | |
| 2021/0144696 A1* | 5/2021 | Cariou | H04W 52/0229 |
| 2021/0391947 A1* | 12/2021 | Jang | H04L 5/0044 |
| 2021/0400727 A1* | 12/2021 | Lu | H04L 1/0068 |

FOREIGN PATENT DOCUMENTS

WO   2021002680 A1   1/2021

* cited by examiner

*Primary Examiner* — Christine Ng
(74) *Attorney, Agent, or Firm* — Edell, Shapiro & Finnan, LLC

(57) ABSTRACT

Preamble puncturing configuration information is encoded in a pad field, and alternatively or additionally, in a Service Field, depending on a transmission bandwidth of a Physical Layer Convergence Protocol (PLCP) Protocol Data Unit (PPDU). Some implementations also encode one or more parity bits in the pad field or Service field. The PPDU including the preamble puncturing configuration information encodes, in various embodiments, a request to send frame, a clear to send frame, a power save poll frame, or a contention free end frame.

20 Claims, 17 Drawing Sheets

| Bits | 0-3 | 4 | 5-6 |
|---|---|---|---|
| RTS | Scrambling Sequence Start 4 | DYN_BANDWIDTH_IN_NON_HT | CH_BANDWIDTH_IN_NON_HT |
| CTS | Scrambling Sequence Start 5 | | |

FIG. 4B

| Resource Unit Size | 996 | 484 | 996 |
|---|---|---|---|
| Bandwidth | 80 Mhz grain | 40 Mhz grain | 160 Mhz grain |
| CH_BW_IN_NON_HT Value | 1 | 2 | 3 |

FIG.4C

| Non-HT (Mbps) | nPad (RTS or CF-End@20B) | nPad (CTS@14B) | nPadCoded (RTS or CF-End@20B) | nPadCoded (CTS@14B) |
|---|---|---|---|---|
| 6 | 10 | 10 | 20 | 20 |
| 9 | 34 | 10 | 45 | 13.333 |
| 12 | 10 | 10 | 20 | 20 |
| 18 | 34 | 10 | 45 | 13.333 |
| 24 | 10 | 58 | 20 | 116 |
| 36 | 106 | 10 | 141.333 | 13.333 |
| 48 | 10 | 58 | 15 | 87 |
| 54 | 34 | 82 | 45.333 | 109.333 |

| Bandwidth (MHz) | Possible Puncturing Modes | Number of Puncturing Modes |
|---|---|---|
| 20 | 1 | 1 |
| 40 | 11 | 1 |
| 80 | 1111, X111, 1X11, 11X1, 111X | 5 |
| 160 | 11111111, xx111111, 11xx1111, 1111xx11, 111111xx, x1111111, 1x111111, 11x11111, 111x1111, 1111x111, 11111x11, 111111x1, 1111111x | 13 |
| 320 | 1111111111111111, xxxx111111111111, 1111xxxx11111111, 11111111xxxx1111, 1111111111111xxxx, xx11111111111111, 11xx111111111111, 1111xx1111111111, 111111xx11111111, 11111111xx111111, 1111111111xx1111, 111111111111xx11, 11111111111111xx, x111111111111111, 1x11111111111111, 11x1111111111111, 111x111111111111, 1111x11111111111, 11111x1111111111, 111111x111111111, 1111111x11111111, 11111111x1111111, 111111111x111111, 1111111111x11111, 11111111111x1111, 111111111111x111, 1111111111111x11, 11111111111111x1, 111111111111111x | 25 |

FIG.7

SIGNALING OF PREAMBLE PUNCTURING CONFIGURATION IN A NON-HIGH THROUGHPUT RTS/CTS EXCHANGE

CROSS REFERENCE TO RELATED APPLICATIONS

This application claims priority to U.S. Provisional Application No. 63/144,632, filed Feb. 2, 2021 and to U.S. Provisional Application No. 63/147,881, filed Feb. 10, 2021. The entirety of each of this applications is incorporated herein by reference.

TECHNICAL FIELD

The present disclosure relates to wireless communication systems and devices.

BACKGROUND

The Request-to-Send (RTS) and Clear-to-Send (CTS) mechanism is used in wireless communication systems to manage access/usage to a channel. In some communication systems, such as an IEEE 802.11 wireless local area network (WLAN), a duplicated RTS frame is sent across multiple bandwidth channels, e.g., 40/80/160 MHz channels to ascertain whether a channel is busy.

In IEEE 802.11, the RTS+CTS frames offer the Network Allocation Vector (NAV) cancellation feature which is understood by many generations of 802.11 products. The NAV cancellation feature allows a third party station (STA) that receives an RTS frame, but no CTS frame, nor a Physical Layer Convergence Protocol (PLCP) Protocol Data Unit (PPDU) at the expected times, to cancel the NAV set by the RTS frame.

Receiving a preamble on one 20 MHz sub-channel of a wider bandwidth PPDU uniquely identifies which 40 MHz, 80 MHz or 160 MHz channel that the protocol unit resides in, but cannot identify an 80+80 MHz channel or 320 MHz channel, due to how channel bandwidths are defined. However, identification information for these two scenarios can be determined post-association such that side information from the association allows the intended receiver to learn the other sub-channels.

Non-high-throughput (non-HT) PPDUs and non-HT duplicate PPDUs do not convey their bandwidth and/or which sub-channels are punctured, though an unpunctured 20, 40, 80 or 160/80+80 MHz bandwidth can be signaled in some circumstances in the scrambling sequence.

In the IEEE 8021.11ac (VHT)/11ax (HE) amendments, the sub-channels used for the duplicated RTS frame must be a superset of the sub-channels used for the duplicated CTS frame, which in turn must be a superset of the sub-channels used for the protected PPDU.

BRIEF DESCRIPTION OF THE DRAWINGS

FIGS. 4A and 4B are diagrams of an Orthogonal Frequency Division Multiplex (OFDM) scrambler and use of the Scrambler Seed for the signaling techniques presented herein, according to an example embodiment.

FIG. 4C illustrates a technique for signaling non-punctured sub-channels, according to an example embodiment.

FIG. 5A shows the number of available Pad bits in a PPDU that may be used for the signaling techniques presented herein, according to an example embodiment.

FIG. 7 illustrates a table describing preamble puncturing modes within different transmission bandwidths.

DESCRIPTION OF EXAMPLE EMBODIMENTS

Overview

Presented herein are techniques to modify a RTS/CTS exchange to signal bandwidth and preamble puncturing modes. In some embodiments, these techniques are used by devices compliant with the IEEE 802.11be extremely high-throughput (EHT) amendment by providing bandwidth and/or preamble puncturing information of IEEE 802.11be PPDUs in non-HT duplicate PPDUs or new control frames. In one form, a method includes encoding a non-high throughput (non-HT) physical layer convergence protocol (PLCP) protocol data unit (PPDU) to include a service field, a payload field, a tail field, and a pad field, the pad field encoded to indicate preamble puncturing configuration information; and transmitting the non-HT PPDU over a wireless network.

EXAMPLE EMBODIMENTS

Protection of a punctured PPDU is sent, in various embodiments, on a wider bandwidth or a narrower (e.g., unpunctured) bandwidth (to provide partial protection). Information sent to provide this protection includes information relating to one or more of bandwidth, channels, and punctured sub-channel information. Since indications of an 80+80 MHz channel and/or a 320 MHz channel are sent post association, channel center frequencies/numbers are not strictly needed (but would be useful if there were unlimited bits for signaling). When RTS/CTS frames need to protect a punctured PPDU, then both the PPDU encoding the RTS frame (and potentially even a PPDU encoding the following CTS frame) need to convey the punctured sub-channel information:

Static case: PPDU encoding an RTS frame sends (punctured) sub-channel information, receiver determines that it is all free and sends a CTS frame on the punctured sub-channels only, and otherwise the receiver sends nothing.

Dynamic case: a PPDU encoding an RTS frame sends (punctured) sub-channel information, the receiver sees some sub-channels free and sends a PPDU encoding a CTS frame on the free channels only with the PPDU including an indication of which punctured and free sub-channels that the CTS is sent on, and otherwise sends nothing. The dynamic case could be disallowed for punctured PPDUs (or the requirement for precise protection of the punctured PPDUs could be weakened), such that, in some embodiments, the PPDU encoding the CTS frame is unchanged, except the meaning of the 160/80+80 MHz bandwidth value (3) is extended to include 320 MHz: i.e., it is defined as 160/80+80/320, and heuristics are used to distinguish between 160 MHz and 320 MHz (e.g. power above a threshold, similarity in power, similarity in time at when the power increased, similarity of waveform, similarity of log-likelihood ratios (LLRs) and/or decoded bits).

Figure 1:
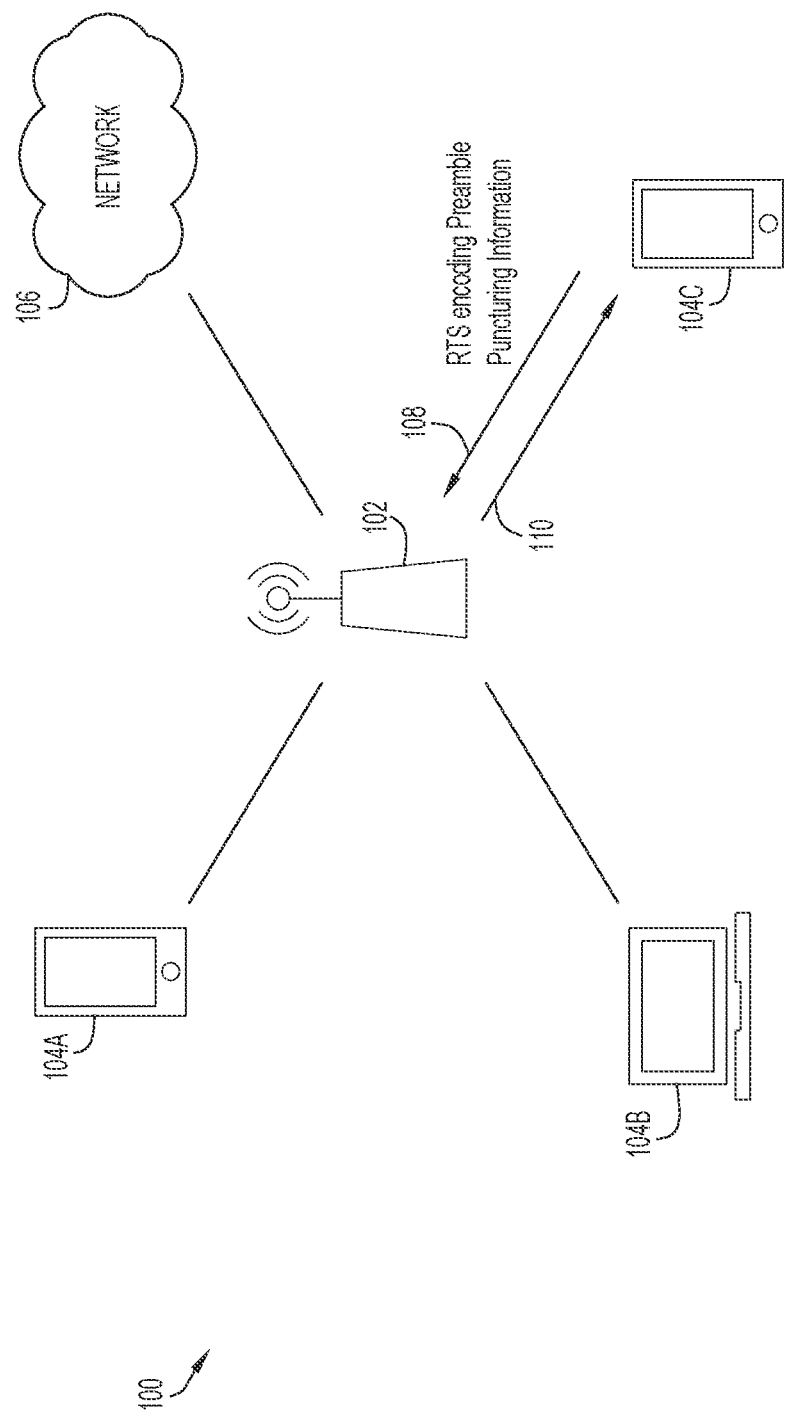
FIG. 1 is an overview diagram of a wireless communication system that may be configured to use the bandwidth signaling techniques presented herein, in accordance with an example embodiment.

FIG. 1 is an overview diagram of a wireless communication system in accordance with an example embodiment. The wireless communication system 100 includes an access point (AP) 102, and three wireless stations, shown as wireless station 104A, wireless station 104B, and wireless station 104C. The AP 102 is also shown in communication with a network 106. Thus, via the wireless communication system 100, each of the wireless station 104A, wireless station 104B, and the wireless station 104C are able to communicate with one or more devices (not shown) accessible via the network 106.

FIG. 1 shows the wireless station 104C transmitting a RTS frame 108 message in a PPDU over the wireless medium. In some embodiments, the PPDU encoding the RTS frame 108 encodes preamble puncturing information in a pad field and/or Service Field in accordance with one or more of the disclosed embodiments. FIG. 1 also illustrates the AP 102 responding to the RTS frame 108 with a second PPDU encoding a CTS frame 110. In some embodiments, the CTS frame 110 included in the second PPDU also encodes preamble puncturing information in one or more of a pad field and/or Service Field of the second PPDU.

As explained above, when receiving an RTS frame sent in a non-high throughput (HT) duplicated PPDU, in order for a device that receives the RTS frame to correctly send the CTS frame in another non-HT duplicated PPDU, the device needs to know on which 20 MHz sub-channels the duplicate RTS frame was sent. One known technique, called "First7BitsofTheScramblingSequence" may be used to signal 20/40/80/(160 or 80+80) MHz channels, such that the signaling is achieved with four (4) values requiring two bits of encoding. But that scheme is not capable of signaling 320 MHz nor is it able to encode punctured preambles (which have 20 MHz granularity).

Using three (3) bits rather than two (2) bits of the above-noted techniques in the First7BitsofTheScramblingSequence to signal 320 MHz (but not puncturing) is not robust because a receiver of the PPDU of the RTS frame is unable to distinguish between a legacy two bit encoding and EHT three bit encoding. For example, using a fourth bit to signal the presence of the third bit does not work reliably if that fourth bit can already be both 0 and 1.

A suitable solution needs to signal the following information:

1) That bandwidth encoding is enhanced with respect to 11ac/11ax (unambiguously or statistically);
2) A 320M bandwidth PPDU; and
3) Preamble puncturing information of an 80/160/320M IEEE 802.11be PPDU (1 mode for unpunctured 320 MHz plus 24 new punctured modes), plus at least 1 more value (and preferably many more values) to handle potential future variations), as depicted in FIG. 7 below.

Figure 2:
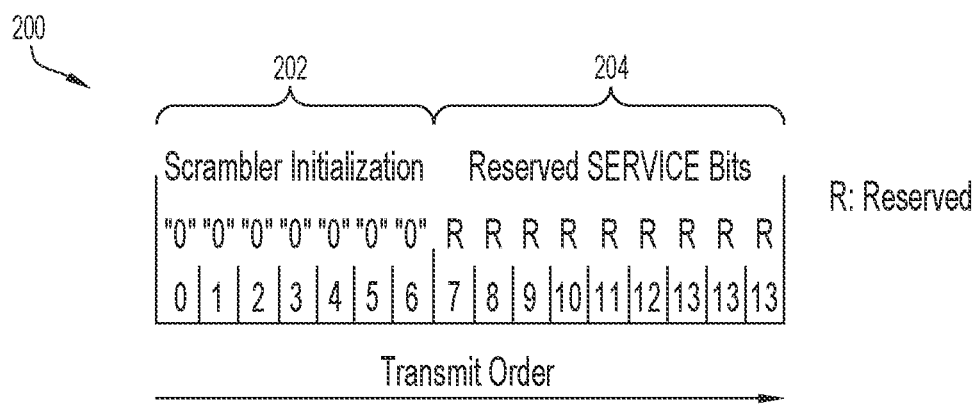
FIG. 2 is a diagram showing a Service field of a physical layer convergence protocol (PLCP) protocol data unit (PPDU) to depict how certain bits of the Service field could be used in the signaling techniques presented herein, according to an example embodiment.

FIG. 2 illustrates a format of a Service Field in accordance with an example embodiment. The Service Field 200 includes a scrambler initialization portion 202 and a reserved portion 204. In some embodiments, one or more bits of the scrambler initialization portion 202 and/or the reserved portion 204 are used to encode preamble puncturing configuration information. For example, in some embodiments, transmissions over a 320 MHz bandwidth encode bandwidth information in the Service field (such as the Service Field illustrated in FIG. 2) and preamble puncturing information of a first 160 MHz bandwidth of the 320 MHz bandwidth in a pad field transmitted within the first 160 MHz portion of the PPDU (not shown) and a second preamble puncturing information of a second 160 MHz bandwidth is transmitted within the second 160 MHz portion of the PPDU.

Preamble puncturing information can be conveyed in various ways in a PPDU including an RTS frame, a CTS frame or elsewhere as now described below. A first technique may involve: Sending the information of "1), 2) and 3)" above in the Service field 200 of FIG. 2, but just at 6 GHz but not at 2.4 or 5 GHz in order to minimize legacy issues. For example, bits 8-15 of the Service field could be used. If there are no legacy issues then an indication of enhanced bandwidth encoding (e.g. "1)" above) is not needed. For example, 6-9 bits of bandwidth information, puncturing information and reserved fields for future amendments as well as 0-3 bits of parity value and/or cyclic redundancy check (CRC) value, could be encoded in a non-HT PPDU's Service field. Allocating more bits to a parity value and/or CRC bits provides more reliability, whereas an option with fewer parity and/or CRC bits provides more future proofing.

Figure 3:
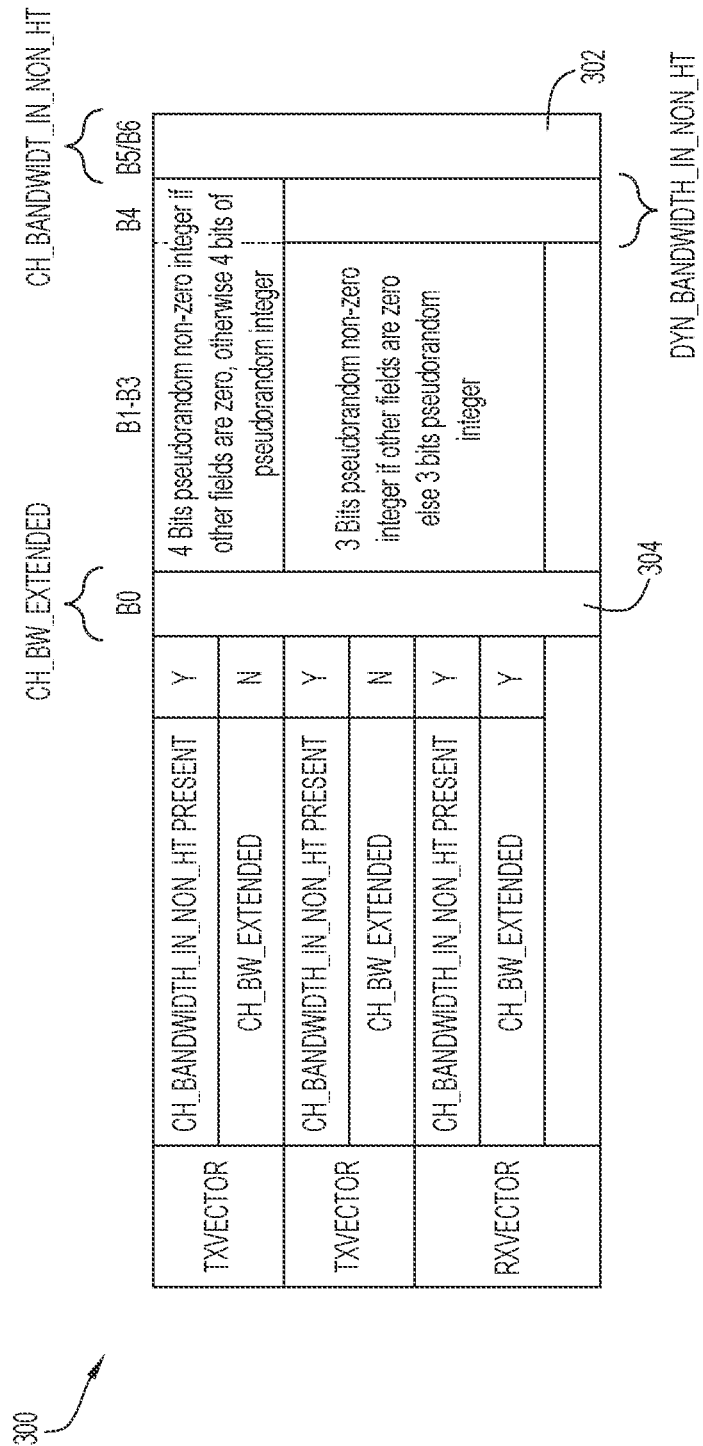
FIG. 3 is a diagram illustrating usage of the first seven bits of a scrambling sequence for the signaling techniques presented herein, for extremely high-throughput (EHT) scenarios, according to an example embodiment.

FIG. 3 illustrates a method of encoding preamble puncturing information that utilizes a portion of a scrambling sequence. FIG. 3 illustrates that 2+1 out of 7 bits of the First7BitsofTheScramblingSequence 300 are used, and what is left is 4-5 pseudorandom bits. In a second technique, two bits of a CH_BANDWIDTH_IN_NON_HT field 302 in the First7BitsofTheScramblingSequence 300 are used to signal 160 MHz, a third bit is used to indicate 320 MHz, that is, the information of numbered bullet item "2)" above, so that a 320 MHz-enabled device has an unreliable hint that 320 MHz channel is more likely/less likely to be present.

Figure 4A:
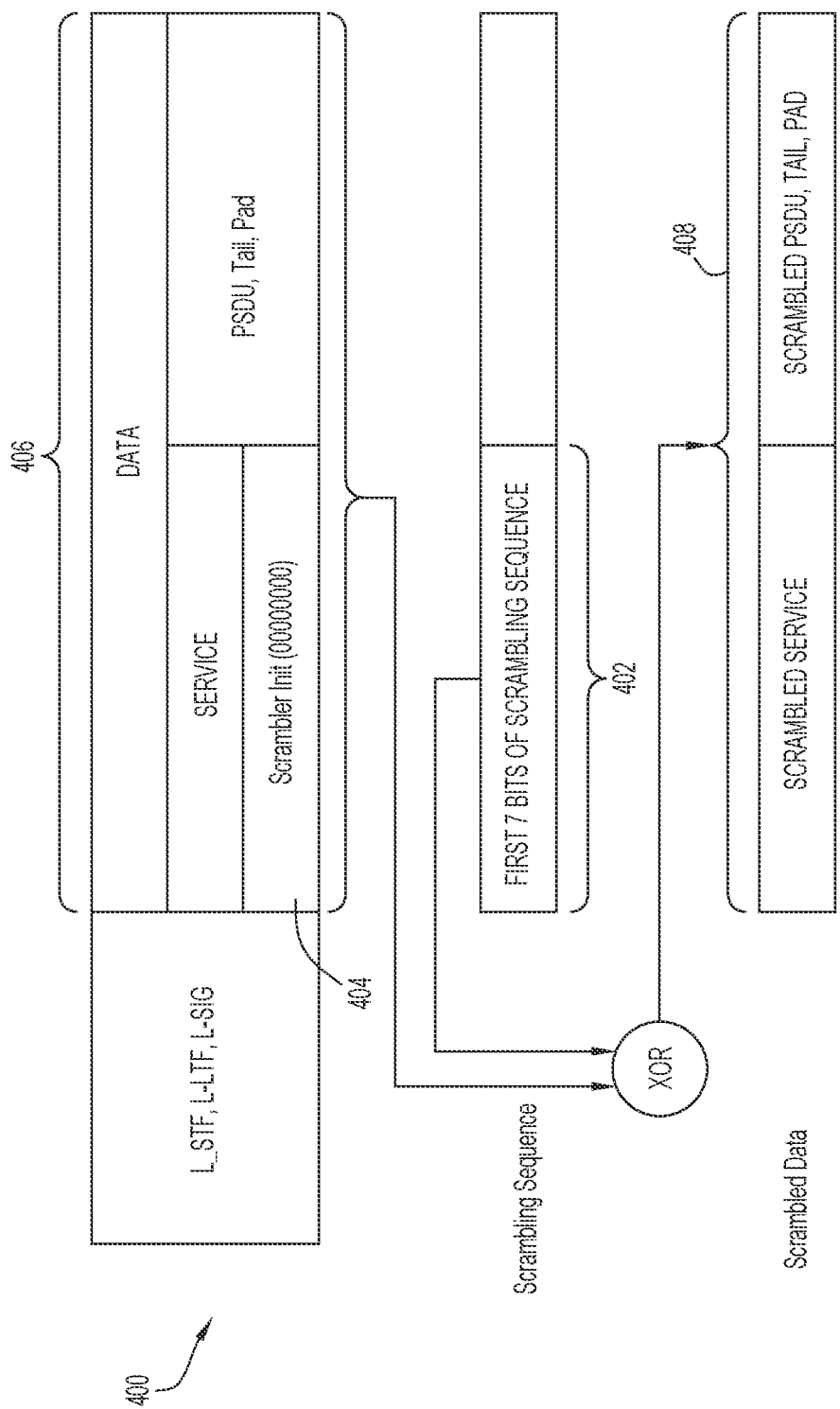

FIG. 4A illustrates a PPDU that includes a scrambler sequence field. A mapping between a scrambler seed value and a first seven bits of a scrambling sequence field is one-to-one. Defining the first seven bits in the scrambling sequence is equivalent to defining the scrambler seed. FIG. 4A illustrates how the first seven bits in a First7BitsinTheScramblingSequence 402 of the PPDU 400 is extended to the duration of the Data field 406 and XORed with the unscrambled data that includes an initial all-zeros scrambler initialization field 404, which results in scrambled data 408. The scrambled data 408 provides for a transmitted signal (available at the receiver) that directly expresses the First7BitsinTheScramblingSequence 402 and allows the receiver to extract the CH_BANDWIDTH_IN_NON_HT field 302 and the CH_BW_EXTENDED field 304 of FIG. 3. Constraints on the pseudorandom sequence (see FIG. 3) ensure that the bits of the First7BitsinTheScramblingSequence 402 are not zero. This provides reduced yet still good protection against sequences with poor peak to average power ratios (PAPRs).

FIG. 4B shows a format 450 of a first seven bits of a scrambler sequence field in RTS and CTS PPDUs in accordance with an example embodiment. FIG. 4B shows a DYN_BANDWIDTH_IN_NON_HT field 452 and a CH_BANDWIDTH_IN_NOT HT field 454.

In some embodiments, predefined constants communicate particular indications, such as described below:

DYN_BANDWIDTH_IN_NON_HT: 0 (Static), 1 (Dynamic)

CH_BANDWIDTH_IN_NON_HT: 0 (20 MHz), 1 (40 MHz), 2 (80 MHz), 3 (160 or 80+80 MHz or 320 MHz)

The format 450 of FIG. 4B has high compatibility since the First 7 Bits in Scrambling Sequence can arise from a valid scrambler seed.

Third technique: Same as the second technique, but a 4th (or more) bits (taken from the pseudorandom fields) is set to equal a known pattern to indicate the information of "1)". This alone cannot preclude false alarms since a legacy device might set this bit to the known pattern with a moderate probability.

Fourth technique: Split the non-punctured 20 MHz subchannels within the PPDU bandwidth into as few 20, 40, 80, or 160 MHz "grains" as possible subject to each grain occupying a defined channel, wherein First7BitsOfTheScramblingSequence is the same within each grain but First7BitsOfTheScramblingSequence may differ between grains, as shown in FIG. 4C. The First7BitsOfTheScramblingSequence field has the same semantics as in VHT/HE. Due to the allowed puncturing patterns, this involves a receiver to have 1 decoder per 20 MHz in the primary 80 MHz, and one decoder per 40 MHz in the remaining PPDU bandwidth (so 320 MHz implies 10 decoders). For an unpunctured 320 MHz, each of the lower and upper 160 MHz portions indicate 160 MHz With Orthogonal Frequency Division Multiple Access (OFDMA), the fourth technique is relatively easy for WLAN access points (APs) to implement, but less so for non-APs.

Fifth technique: Same as the fourth technique, but also signal the PPDU's full bandwidth elsewhere (e.g., in the Service field like Option A or in the post-Tail bits like Option D below).

Sixth technique: Use the post-Tail bits in the non-HT PPDU encoding the RTS (and likely CTS too) frame to include 3 bits of bandwidth information towards the information of "2)" and/or more bits to signal the full preamble puncturing information towards the information of "3)" and/or allocate zero or more bits between a) a known pattern or b) parity bit(s) or a cyclic redundancy check (CRC) for at least one of the bandwidth and puncturing fields towards "1)". In a first variation to the sixth technique, the new fields are inserted before the scrambler (for PAPR robustness; and non-zero by design to indicate the presence of the new fields).

FIG. 5A illustrates a table 500 number of available uncoded and coded pad bits available after a tail field for different modes, in accordance with an example embodiment.

Figure 5B:
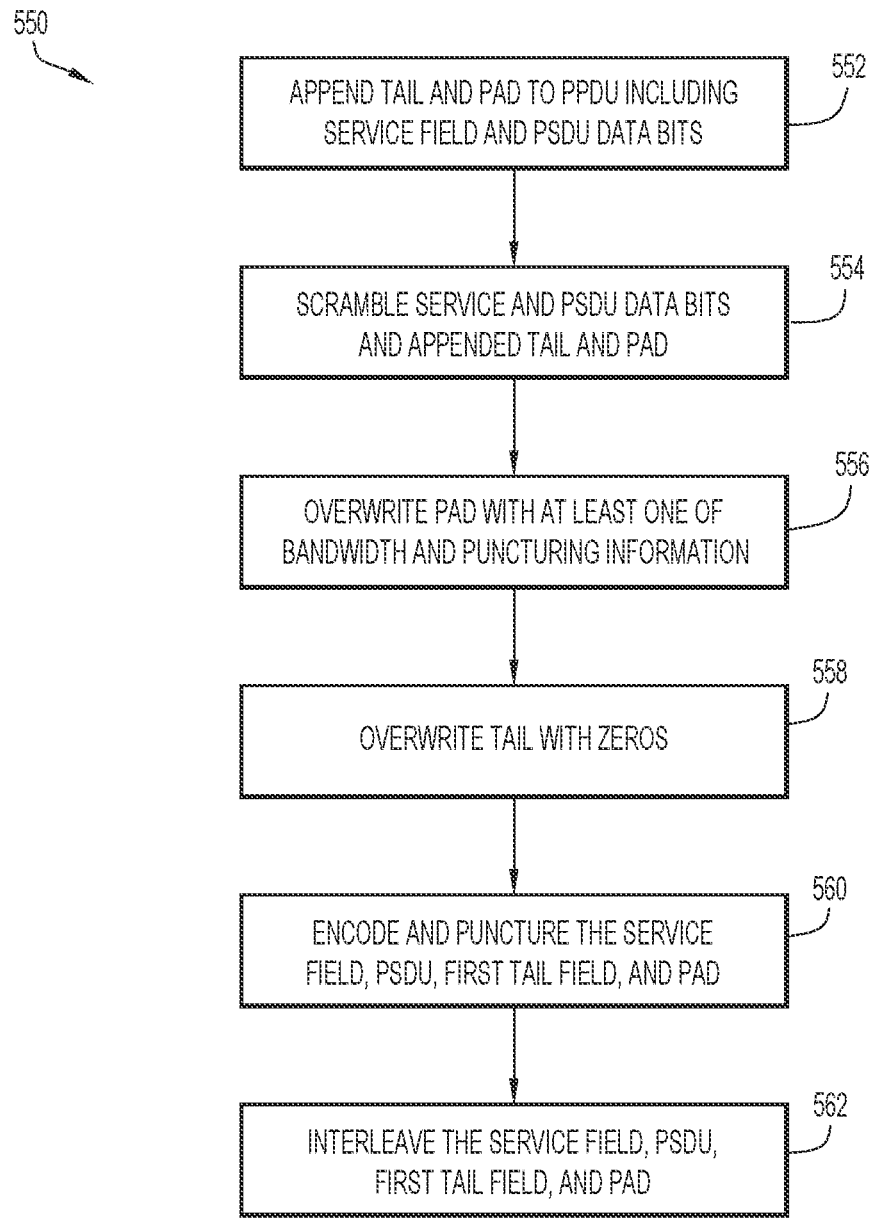
FIG. 5B shows a flow diagram depicting how bandwidth and puncturing information may be inserted into the uncoded, scrambled Pad bits, according to an example embodiment.

FIG. 5B is a flowchart of a method 550 of inserting bandwidth and/or preamble puncturing information after the scrambling process, according to a second variation to the sixth technique. This simplifies decoding. In this variation, it is simplest to include, as part of the new fields, an allocation of one bit to indicate the presence of the new fields. Since there is little room for a new Tail field, later data bits are encoded as fewer coded bits in 6, 12, 24, 48 Mbps RTS frames and 6, 9, 12, 18, 36 Mbps CTS frames. Sample contents for the ten uncoded bits, B0-B9, are B0=!ScrambledPad at this bit position; up to B1-7,B9=BW+Punc Info with values 0-36 defined in 6/7/8 bits and the other values and 2/1/0 bits respectively reserved for a future amendment; B8=parity. Another sample contents is to use the bandwidth information signaled elsewhere and signal the bandwidth-dependent preamble puncturing information. In these embodiments, five bits are needed (or six for growth). Thus, bit B0=!ScrambledPad at this bit position; up to bits B1-6 are set to indicate bandwidth and preamble puncturing configuration information, up to bits B6-B8 are set to indicate parity bits or CRC and at least bits B9-B10 are reserved. An EHT receiver processes the L=min(10+nTail, nPad)/R≤32 LLRs after the nTail=6 bit Tail field as follows: for each of the N allowed sequences, calculate N inner products between the length-L LLR vector and each of N pre-calculated codeword vectors (entries are ±1); then pick the sequence with the maximum inner product. Thus, method 550 of FIG. 5B includes operation 552, in which a tail and pad field are appended to Service field and physical layer service data unit (PSDU) data bits. In operation 554, the Service field and PSDU data bits, and the appended tail and pad bits are scrambled. The pad field is overwritten with at least one of bandwidth and/or puncturing configuration information in operation 556. In operation 558, the tail field is overwritten with zero values. In operation 560, the service field, PSDU data bits, first tail field, and pad are encoded and punctured. In operation 562, the encoded and punctured Service field, PSDU, first tail field, and pad are interleaved.

Figure 5C:
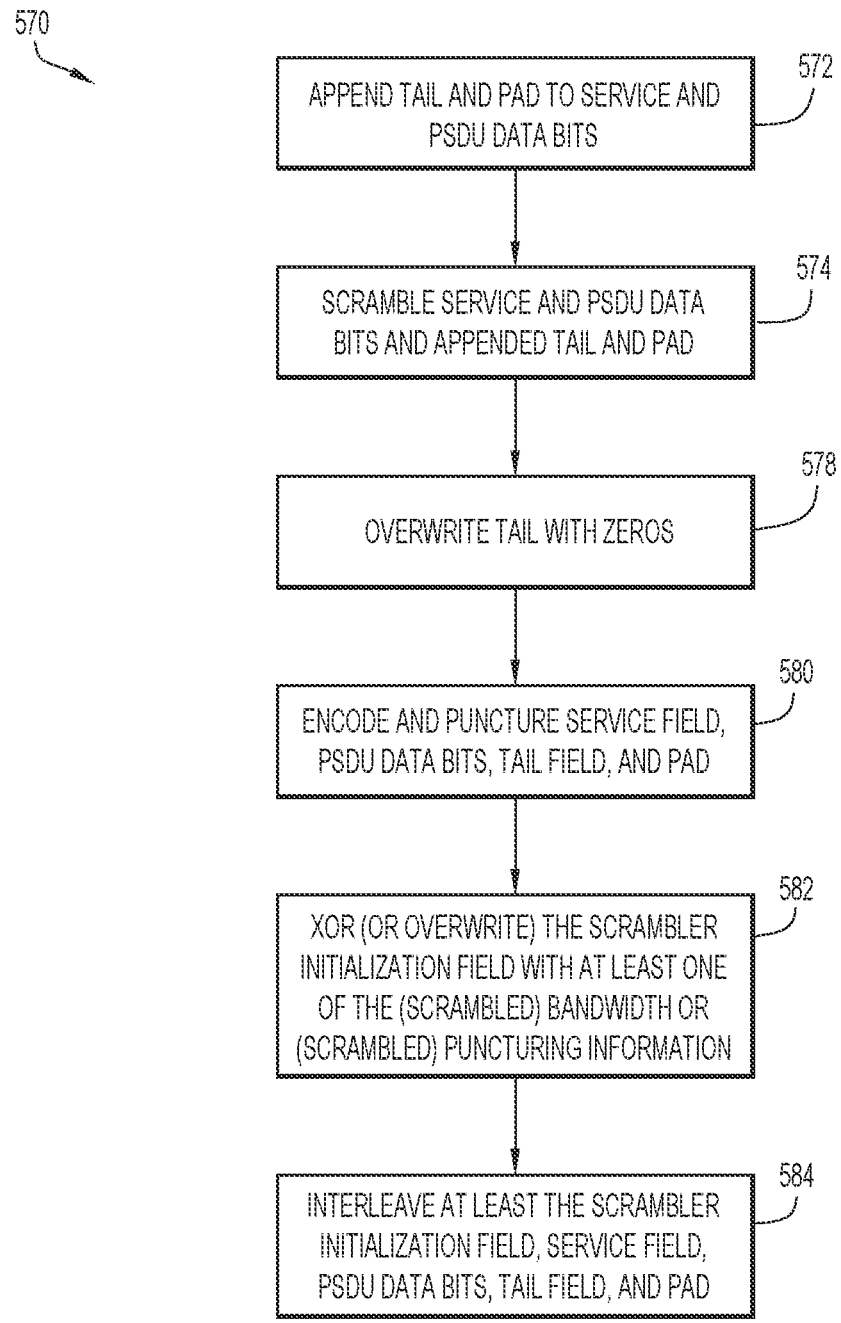
FIG. 5C shows a flow diagram depicting how bandwidth and puncturing information may be inserted into the coded Pad bits, according to an example embodiment.

FIG. 5C is a flowchart of a method of generating a PPDU that inserts preamble puncturing information into encoded pad bits, according to a seventh technique. In method 570 of FIG. 5C, a tail and pad field are appended to a Service Field and PSDU data bits in the operation 572. In the operation 574, the Service Field and PSDU data bits, and the appended tail and pad bits are scrambled. In operation 578, the tail field is overwritten with zero values. In operation 580, the service field, PSDU data bits, tail field, and pad are encoded and punctured. In operation 582, the scrambler initialization field is exclusive or'ed (XOR'd) with at least one of the (optionally but preferably scrambled) bandwidth and/or puncturing information. In operation 584, the data resulting from operations 580 and 582, that is, at least the service field, PSDU data bits, tail field, and pad, along with the scrambler initialization field, are interleaved. In a first variation to this technique, the coded pad field is overwritten with one or more of bandwidth or preamble puncturing information (at the cost of PAPR robustness; also one (1) bit may be allocated to indicate the presence of the new data). In a second variation, instead, the bandwidth and/or preamble puncturing information is exclusive or'ed (XOR'd) with the coded Pad field (for PAPR robustness; and non-zero by design to indicate the presence of the new fields). Since no coding gain is available, for this variation, sample contents for the 24 coded bits are 5/6 bits of Bandwidth and Puncturing Information and 1/0 bits reserved for used by a future amendment respectively, these six bits are repeated (for coding gain), and these twelve bits are protected either by an eight bit CRC or an eight bit of row/column parity bits which are calculated for a 4×3 (2 dimensional) array of the twelve new information and repeated bits.

Eighth technique: Retrofit bandwidth and/or preamble puncturing information into a PPDU encoding the multi-user (MU)-RTS frame or, some equivalent revision of it. For example, a Trigger frame is used, in some embodiments, with a new trigger type of Extremely High Throughput (EHT)-MU-RTS. However, when a modified CTS frame or new "EHT-CTS" control frame is solicited from more than one STA, it should have the same contents, either because the CTS/EHT-CTS is unicasted or transmitted identically by all STAs (i.e. with identical bandwidth information) or transmitted in a non-overlapping manner (e.g. per 20 MHz) by the STAs, or some combination of these techniques.

Ninth technique: Some combination of any many/all of the aforementioned techniques if there are not enough bits in one place. Specifically, to signal the existence of the enhanced coding, an N-bit "unique word" (e.g. N>>8) may be used to indicate that very likely the signaling (sent elsewhere) is indeed enhanced. For example, ten bits are used from the uncoded Pad bits and 1-2 bits more are used from First7BitsOfScramblingSequence, and this is sent differently per 20/40/80/160 MHz to create multiples of these bits.

Figure 6A:
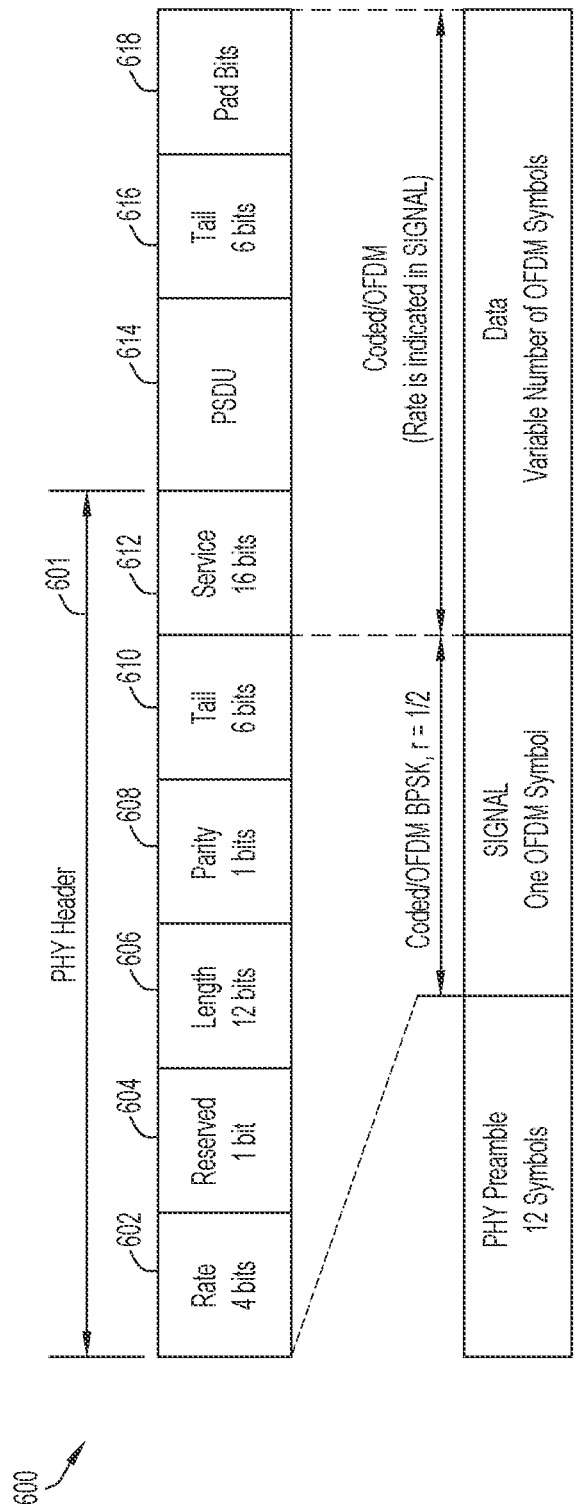
FIG. 6A illustrates a format of a PPDU that includes Pad bits after the Tail bits, where the Pad bits are used for the signaling techniques presented herein, according to an example embodiment.

FIG. 6A illustrates a format of a PPDU, in accordance with an example embodiment. The PPDU 600 includes a PLCP header 601, which includes a rate field 602, a reserved field 604, a length field 606, a parity bit 608, a tail field 610, and a Service Field 612. The PPDU 600 also includes a PSDU 614, a first tail field 616, and a pad field 618. As discussed above, some of the disclosed embodiments encode preamble puncturing configuration information in one or more of the pad field 618 or the Service Field 612. FIG. 6A illustrates that the pad field 618 is located after the first tail field 616 (note that Tail field 610 is considered a "zeroth" Tail field) within a non-HT PPDU format. Thus, the pad field 618 is a particularly useful source of spare bits. In some embodiments, the PSDU 614 encodes an RTS frame or a CTS frame.

Figure 6B:
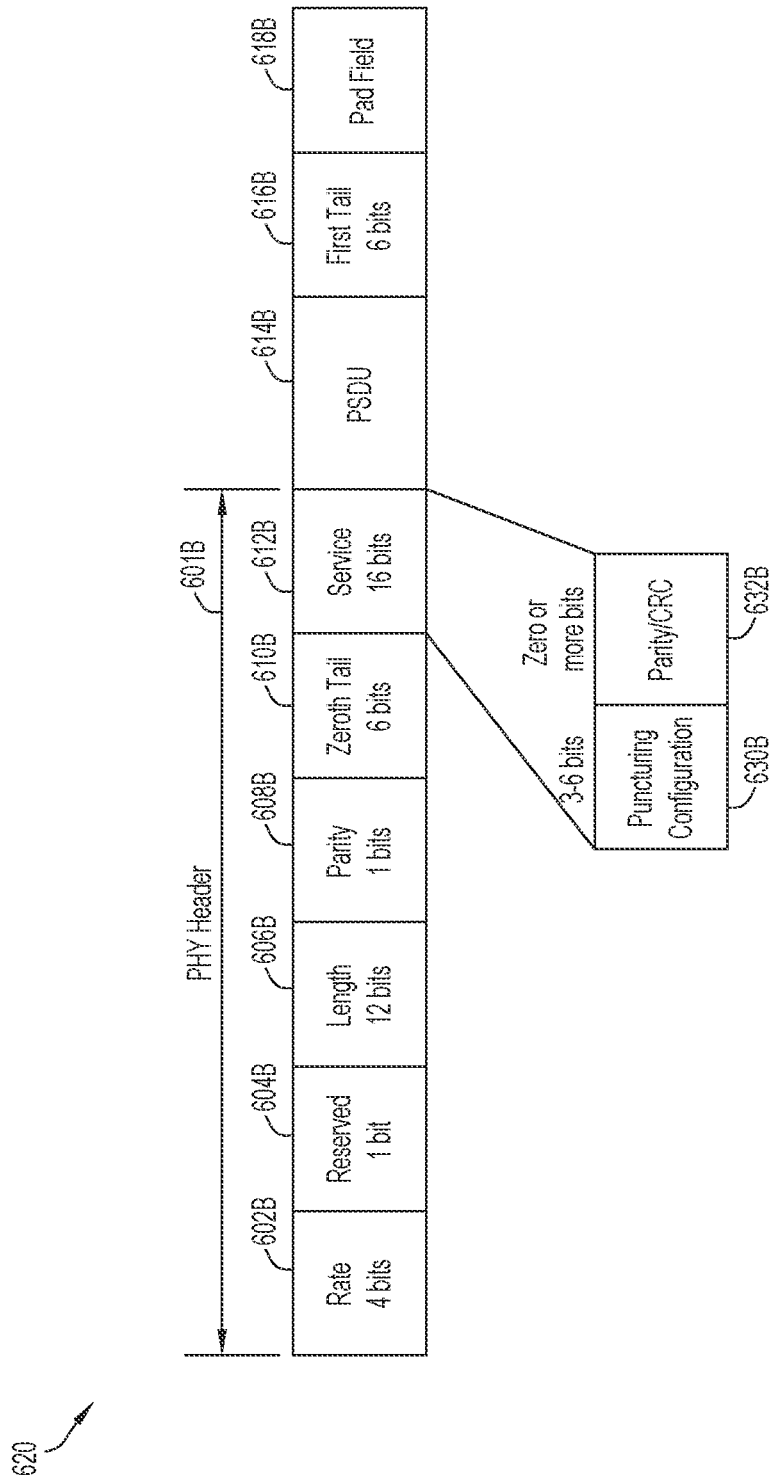
FIG. 6B illustrates a format of a PPDU that encodes preamble puncturing information in a service field, in accordance with an example embodiment.

FIG. 6B illustrates a format of a PPDU that encodes preamble puncturing information in a service field, in accordance with an example embodiment. The PPDU 620 of FIG. 6B includes a PLCP header 601B. The PLCP header 601B includes a rate field 602B, a reserved field 604B, a length field 606B, a parity bit 608B, a zeroth tail field 610B, and a Service Field 612B. The PPDU 620 also includes a PSDU 614B, a first tail field 616B, and a pad field 618B. In some embodiments, the PSDU 614B encodes an RTS frame or a CTS frame. In the embodiment of FIG. 6B, all 20 MHz sub-channels of a transmission share equivalent header information, which includes the PLCP header 601B, the first tail field 616B and the pad field 618B.

Figure 6C:
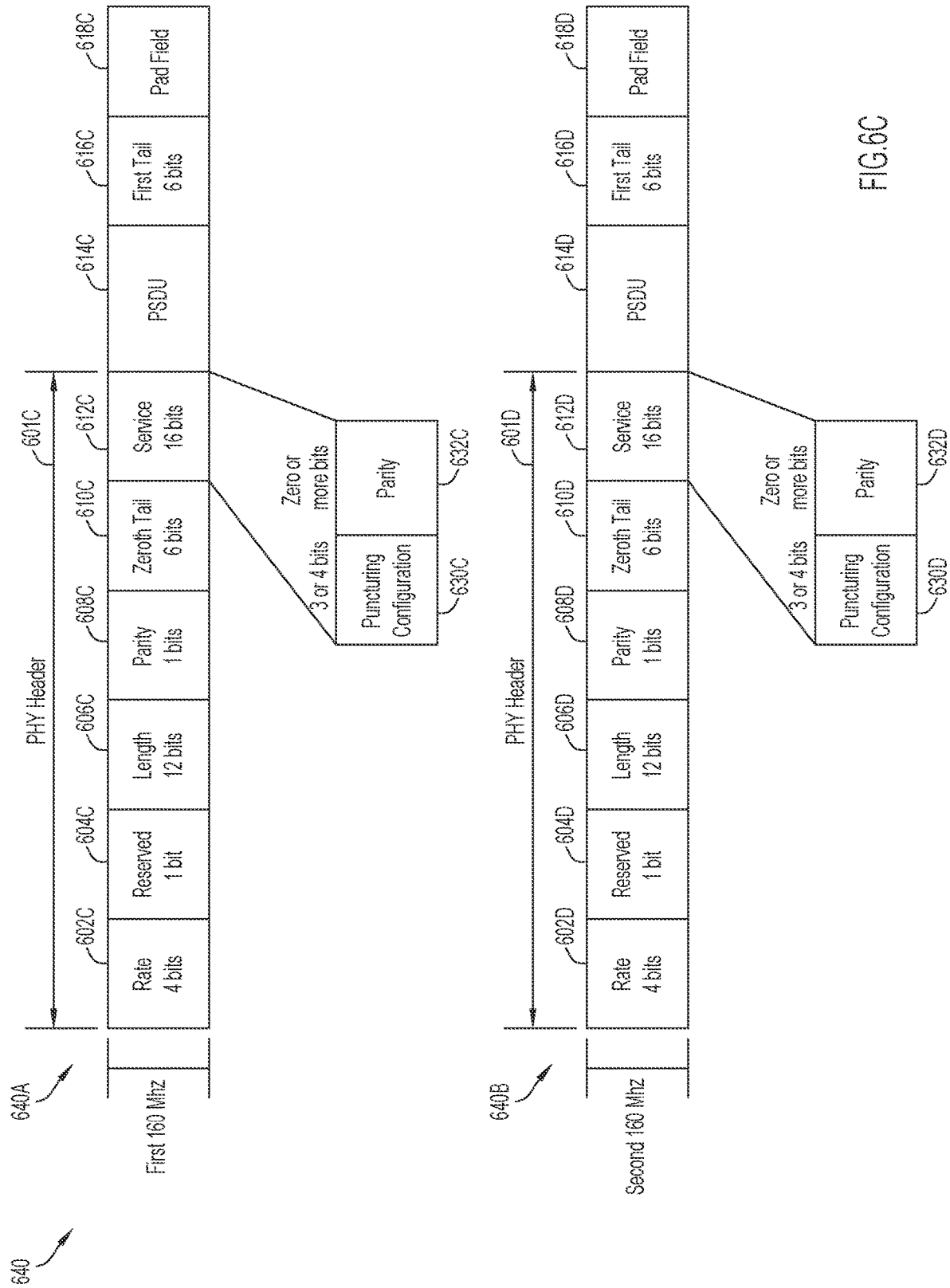
FIG. 6C illustrates a format of a PPDU that encodes first preamble puncturing information of a first 160 MHz bandwidth in a first service field, and optionally encodes second preamble puncturing information for a second 160 MHz bandwidth (if present) in a second service field, in accordance with an example embodiment.

The PPDU 620 of FIG. 6B encodes preamble puncturing configuration information in the service field 612B. Thus, the service field 612B includes between three and six bits of preamble puncturing configuration information 630B and zero or more parity or cyclic redundancy check (CRC) bits 632B FIG. 6C illustrates a format of a PPDU that encodes first preamble puncturing information of a first 160 MHz bandwidth in a first service field, and optionally encodes second preamble puncturing information for a second 160 MHz bandwidth (if present) in a second service field, in accordance with an example embodiment. The PPDU 640 of FIG. 6C includes at least two portions, shown in FIG. 6C as a first portion 640A and a second portion 640B. The second portion 640B is optional in that it is only present with 320 MHz transmissions. The second portion 640B is only present with 320 MHz bandwidth transmissions. The first portion 640A includes a PLCP header 601C. The PLCP header 601C includes a rate field 602C, a reserved field 604C, a length field 606C, a parity bit 608C, a zeroth tail field 610C, and a Service Field 612C. The first portion 640A also includes a PSDU 614C, a first tail field 616C, and a pad field 618C. In some embodiments, the PSDU 614C encodes an RTS frame or a CTS frame. In the embodiment of FIG. 6C, all 20 MHz sub-channels of an 80 MHz, 160 MHz, or first 160 MHz bandwidth of a 320 MHz transmission share equivalent header information, which includes the PLCP header 601C, the first tail field 616C and the pad field 618C.

The first portion 640A of FIG. 6C encodes first preamble puncturing configuration information in the service field 612C. Thus, the service field 612C includes between three and six bits of first preamble puncturing configuration information 630C and zero or more parity or cyclic redundancy check (CRC) bits 632C. The first preamble puncturing configuration information 630C defines a preamble puncturing mode of an 80 MHz, 160 MHz, or first 160 MHz of a 320 MHz bandwidth transmission in these embodiments.

The second portion 640B includes a PLCP header 601D. The PLCP header 601D includes a rate field 602D, a reserved field 604D, a length field 606D, a parity bit 608D, a zeroth tail field 610D, and a Service Field 612D. The second portion 640B also includes a PSDU 614D, a first tail field 616D, and a pad field 618D. In some embodiments, the PSDU 614D encodes an RTS frame or a CTS frame. In the embodiment of FIG. 6C, all 20 MHz sub-channels of a second 160 MHz bandwidth of a 320 MHz transmission share equivalent header information, which includes the PLCP header 601D, the first tail field 616D and the pad field 618D.

The second portion 640B of FIG. 6C encodes second preamble puncturing configuration information in the service field 612D. Thus, the service field 612D includes between three and six bits of second preamble puncturing configuration information 630D and zero or more parity or cyclic redundancy check (CRC) bits 632D. The second preamble puncturing configuration information 630D defines a preamble puncturing mode of a second 160 MHz of a 320 MHz bandwidth transmission in these embodiments. Note that for 80 MHz and 160 MHz bandwidth transmissions, the second portion 640B is not present.

Figure 6D:
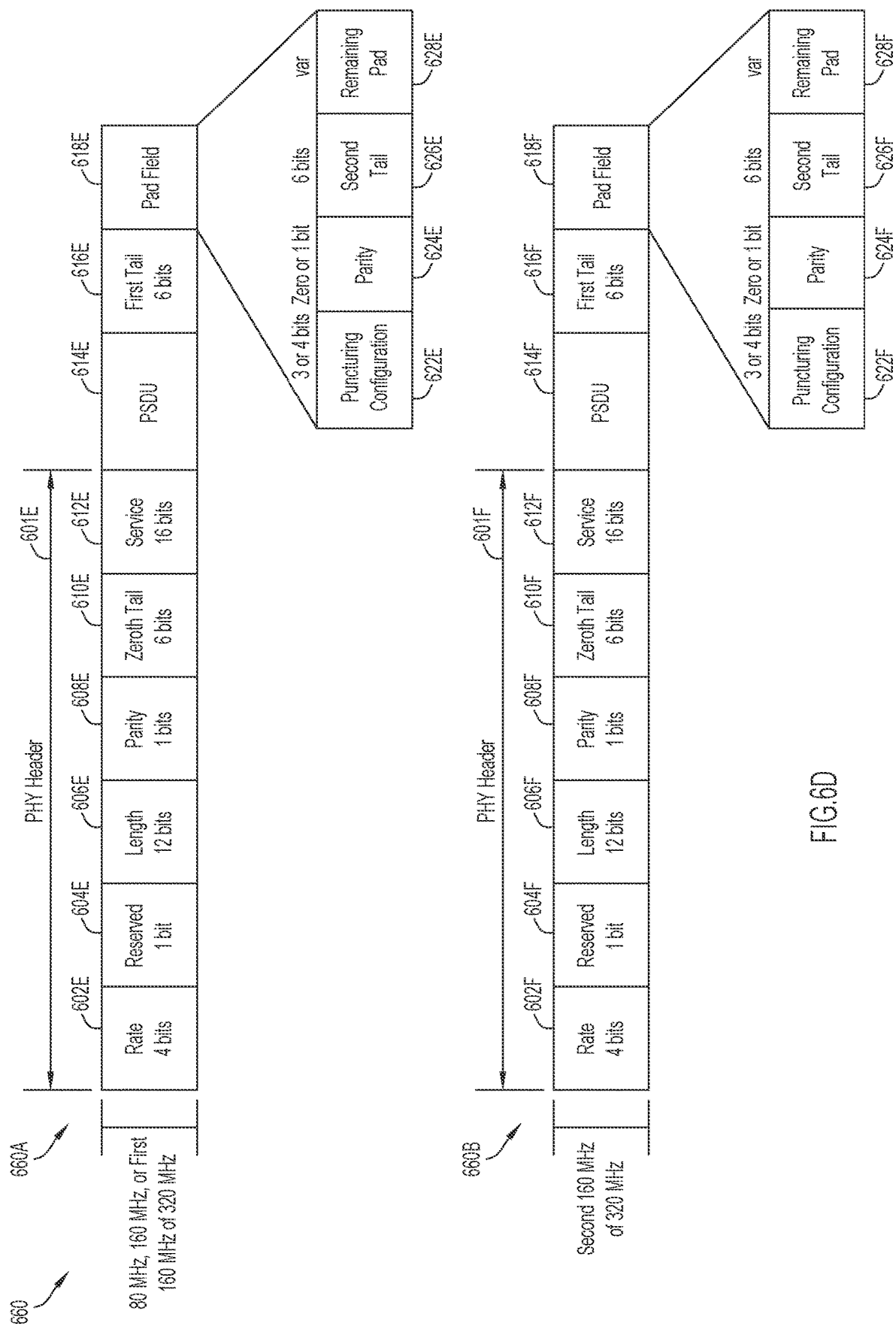
FIG. 6D illustrates a format of a PPDU that encodes first preamble puncturing information of a first 160 MHz bandwidth in a first pad field, and optionally encodes second preamble puncturing information for a second 160 MHz bandwidth (if present) in a second pad field, in accordance with an example embodiment.

FIG. 6D illustrates a format of a PPDU that encodes first preamble puncturing information of an 80 MHz transmission, 160 MHz transmission, or a first 160 MHz bandwidth of a 320 MHz transmission in a first pad field, and optionally encodes second preamble puncturing information for a second 160 MHz bandwidth (if present in a 320 MHz transmission) in a second pad field, in accordance with an example embodiment.

The PPDU 660 of FIG. 6D includes a first portion 660A and a second portion 660B, which is optional in that the second portion 660B is only present in a 320 MHz transmission. The first portion 660A includes a PLCP header 601E. The PLCP header 601E includes a rate field 602E, a reserved field 604E, a length field 606E, a parity bit 608E, a zeroth tail field 610E, and a Service field 612E. The first portion 660A also includes a PSDU 614E, a first tail field 616E, and a first pad field 618E. In some embodiments, the PSDU 614E encodes an RTS frame or a CTS frame. In the embodiment of FIG. 6D, all 20 MHz sub-channels of an 80 MHz, 160 MHz, or first 160 MHz bandwidth of a 320 MHz transmission share equivalent header information, which includes the PLCP header 601E, the first tail field 616E and the first pad field 618E.

The first portion 660A of FIG. 6D encodes first preamble puncturing configuration information in the first pad field 618E. Thus, the first pad field 618E includes between three and six bits of first preamble puncturing configuration information 622E and zero or one parity bits 624E. The first preamble puncturing configuration information 622E defines a preamble puncturing mode of an 80 MHz, 160 MHz, or first 160 MHz of a 320 MHz bandwidth transmission in these embodiments, and is either three or four bits long, in at least some embodiments. The first pad field 618E also includes a second tail field 626E, and zero or more remaining pad bits 628E.

The second portion 660B includes a PLCP header 601F. The PLCP header 601F includes a rate field 602F, a reserved field 604F, a length field 606F, a parity bit 608F, a zeroth tail field 610F, and a Service field 612F. The second portion 660B also includes a PSDU 614F, a first tail field 616F, and a second pad field 618F. In some embodiments, the PSDU 614F encodes an RTS frame or a CTS frame. In the embodiment of FIG. 6D, all 20 MHz sub-channels of a second 160 MHz bandwidth of a 320 MHz transmission share equivalent header information, which includes the PLCP header 601F, the first tail field 616F and the second pad field 618F.

The second portion 660B of FIG. 6D encodes second preamble puncturing configuration information in the second pad field 618F. Thus, the second pad field 618F includes either three or four bits of second preamble puncturing configuration information 622F and zero or one parity bits 624F. The second preamble puncturing configuration information 622F defines a preamble puncturing mode of second 160 MHz of a 320 MHz bandwidth transmission in these embodiments. The second pad field 618F also includes a second tail field 626F, and zero or more remaining pad bits 628F. With 80 MHz and 160 MHz bandwidth transmissions, the second portion 660B is not present.

Figure 6E:
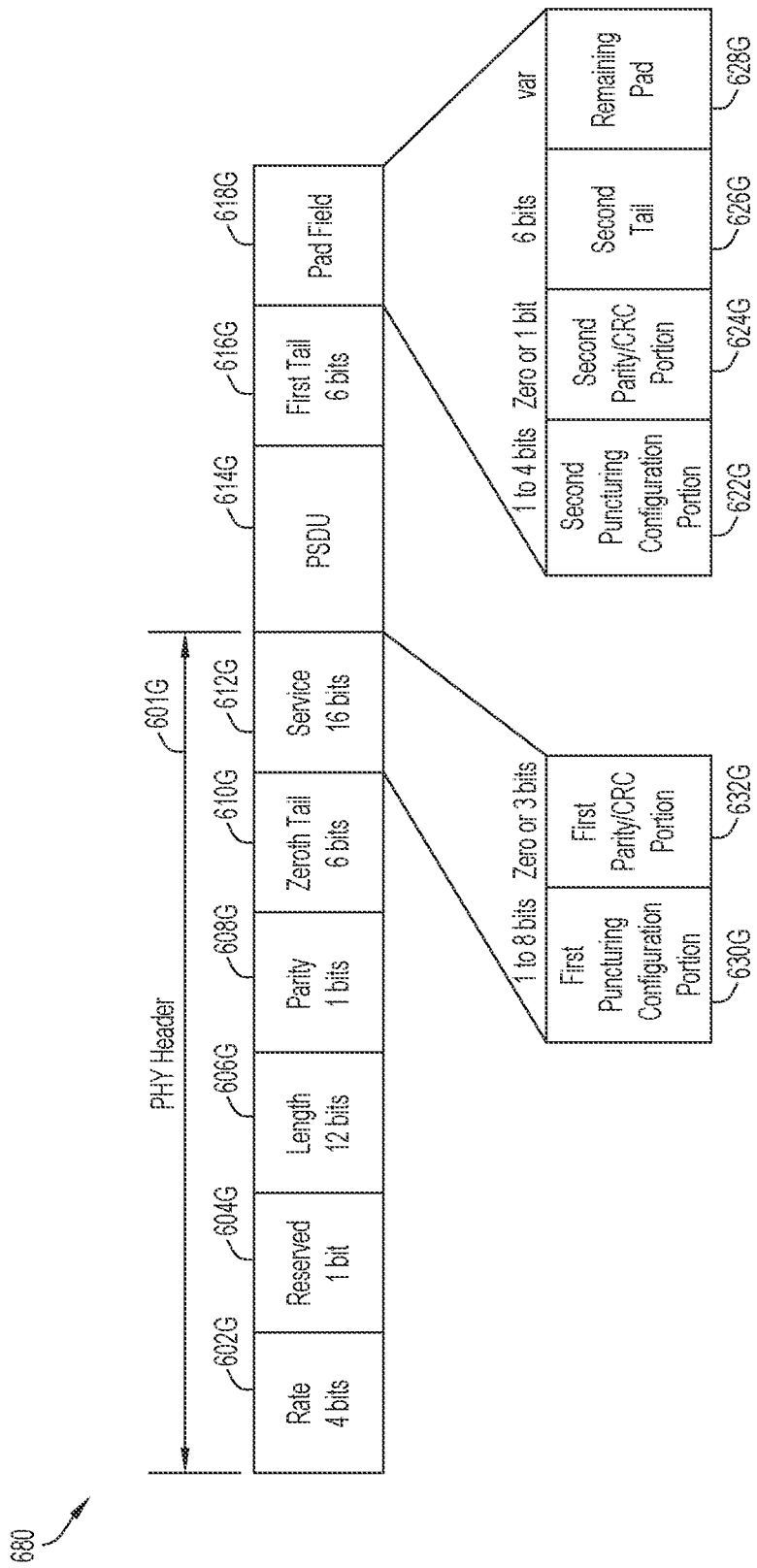
FIG. 6E illustrates a format of a PPDU that encodes preamble puncturing information in both a service field and a pad field.

FIG. 6E illustrates a format of a PPDU that encodes preamble puncturing information in both a service field and a pad field. The PPDU 680 of FIG. 6E includes a PLCP header 601G. The PLCP header 601G includes a rate field 602G, a reserved field 604G, a length field 606G, a parity bit 608G, a zeroth tail field 610G, and a Service Field 612G. The PPDU 680 also includes a PSDU 614G, a first tail field 616G, and a first pad field 618G. In some embodiments, the PSDU 614G encodes an RTS frame or a CTS frame. In the embodiment of FIG. 6E, all 20 MHz sub-channels of an 80 MHz, 160 MHz, or 320 MHz transmission share equivalent header information, which includes the PLCP header 601G, the first tail field 616G and the first pad field 618G.

The PPDU 680 of FIG. 6E encodes first preamble puncturing configuration information in the service field 612G. Thus, the service field 612G includes between three and six bits of first preamble puncturing configuration information 630G and zero or more (e.g. up to three in some embodiments) parity or cyclic redundancy check (CRC) bits 632G. The first preamble puncturing configuration information 630G defines, in combination with the second preamble puncturing configuration information 622G discussed below, a preamble puncturing mode of an 80 MHz, 160 MHz, or 320 MHz bandwidth transmission in these embodiments.

The PPDU 680 of FIG. 6E also encodes second preamble puncturing configuration information in the first pad field 618G. Thus, the first pad field 618G includes three or four bits of the second preamble puncturing configuration information 622G and zero or one parity or CRC bits 624G. The second preamble puncturing configuration information 622G partially defines, in combination with the first preamble puncturing configuration information 630G of the service field 612G, a preamble puncturing mode of an 80 MHz, 160 MHz, or 320 MHz bandwidth transmission in these embodiments. The first pad field 618G also includes a second tail field 626G within the first pad field 618G, and zero or more remaining pad bits 628G.

FIG. 7 is a table 700 describing preamble puncturing modes within different transmission bandwidths. A first column 705 identifies a transmission bandwidth. A second column 710 defines possible preamble puncturing configurations when transmitting a PPDU within the bandwidth specified in the first column 705. A third column 720 identifies a number of different puncturing modes available in the given bandwidth of the first column 705. The preamble puncturing configurations described by the second column 710 of FIG. 7 use a notation where a "1" character indicates that a corresponding 20 MHz sub-channel is not punctured, and a "x" character to indicate that a corresponding 20 MHz sub-channel is punctured. Thus, for example, a notation of "1111" indicates no sub-channels of four indicated sub-channels are punctured, a notation of "xxxx" indicates four sub-channels of four sub-channels are punctured, and a notation of "x1x1" indicates a first and third sub-channel of four sub-channels are punctured, while a second and fourth sub-channel of the four sub-channels are not punctured. In some embodiments each possible preamble puncturing configuration of a particular bandwidth is assigned a unique identifier. Some of the disclosed embodiments then encode the unique identifier in a pad field and/or a Service Field to communicate a preamble puncturing configuration of a transmission bandwidth. In some embodiments, a parity of the encoded unique identifier is determined, and a parity bit is encoded (based on the determined parity) along with the encoded unique identifier.

Figure 8:
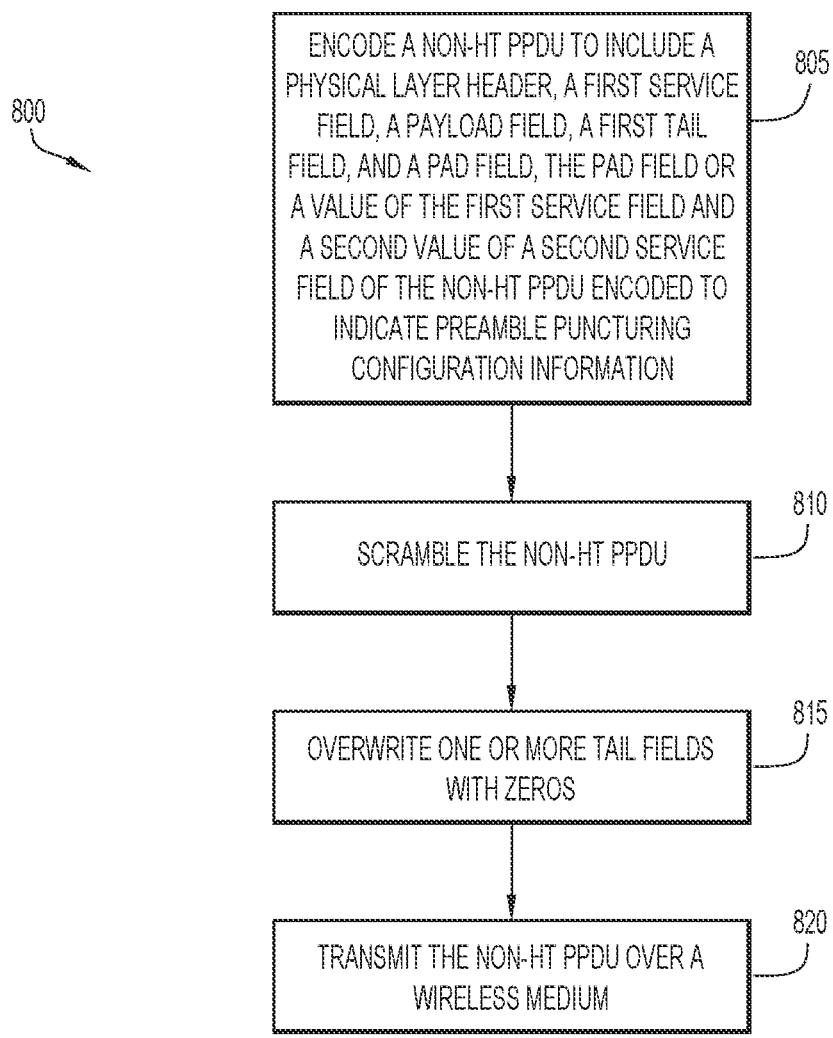
FIG. 8 is a flowchart of a method for encoding puncturing information in an unscrambled pad field according to an example embodiment.

FIG. 8 is a flowchart of a method 800 for encoding preamble puncturing information in a PPDU. In some embodiments, the method 800 is performed by the AP 102 or the wireless station 104C discussed above with respect to FIG. 1.

In operation 805, a non-HT PPDU is encoded to include, in at least some embodiments, a physical layer header, a payload field, a first tail field, and a pad field. The physical layer header includes, in at least some embodiments, one or more of a zeroth tail field, or a first Service Field. In some embodiments, payload field is encoded to represent an RTS frame, a CTS frame, a Contention Free (CF) End frame, or a Power Save (PS) Poll frame.

In some embodiments, at least a first portion of the preamble puncturing information is encoded in the pad field. In some embodiments, the pad field includes at least ten (10) bits. In some embodiments, the pad field is further encoded to include a second tail field (e.g. second tail field 626E). The at least first portion of the preamble puncturing configuration information (and in some embodiments, a complete representation of the preamble puncturing configuration information for the non-HT PPDU) is encoded within either three or four bits of the pad field. If only three bits are utilized, there is room remaining for a parity bit.

In some of these embodiments (e.g., embodiments performing a 320 MHz transmission of the PPDU), a second portion of the preamble puncturing configuration information is encoded in the first service field (e.g., analogous to the example of FIG. 6E), or in a second pad field (analogous to the example of FIG. 6D). In embodiments encoding the second portion in the first Service Field, the first Service Field is encoded with parity information that is based on the second portion of the preamble puncturing configuration (e.g. parity in the first Service Field covers preamble puncturing configuration information encoded in the first Service Field). The pad field in some of these embodiments also includes parity information. In some embodiments, the parity information of the pad field is based on the first portion and second portion of preamble puncturing configuration information (encoded in the pad field and first Service Field respectively).

Alternatively, some embodiments encode the second portion of the preamble puncturing information using three bits of a second pad field. Optionally a bit of parity is included in the second pad field. When encoding the second portion in the pad field, some embodiments use four bits of the second pad field to encode preamble puncturing configuration information, without a parity bit. Other embodiments encode the second portion of the preamble puncturing information using three bits of the second pad field, and optionally include a parity bit.

In some other embodiments, at least a first portion of the preamble puncturing configuration information is encoded in a value stored in the first service field. In these embodiments (e.g., a PPDU transmitted across a 320 MHz bandwidth), a second portion of the preamble puncturing configuration information is encoded in a different value stored in a second service field (e.g. analogous to the example of FIG. 6C). Thus, the first and second service fields store different values, each value storing between three and six bits of preamble puncturing configuration information, and zero or more bits of parity/CRC information.

In some embodiments which preamble puncturing mode is in use by the non-HT PPDU is indicated, by the preamble puncturing configuration information, via encoding of a predefined constant associated with the indicated puncturing information e.g., identifying one or more of the puncturing modes of second column 710 of FIG. 7). In some embodiments, the preamble puncturing configuration information is selected from a predefined set of preamble puncturing configurations. In some embodiments, the selection is based on a transmission bandwidth of the non-HT PPDU In some embodiments, encoding of the PPDU includes concatenating the Service field, the payload field, the first tail field, and the pad field, and replacing/overwriting a portion of the pad field to encode the preamble puncturing configuration and any parity. In some embodiments, a second tail field is encoded within the pad field.

In operation 810, the non-HT PPDU is scrambled. For example, in some embodiments, the concatenation of the Service field, PSDU, first Tail field and pad field (containing the preamble puncturing configuration, any parity, and second tail field) are scrambled.

Scrambling the non-HT PPDU includes, in some embodiments, includes scrambling one or more of the service field, the first tail field, the pad field, or a second tail field encoded in the pad field. As discussed above, in some embodiments, an identical PLCP header, first tail field, and pad field are transmitted with every 20 MHz sub-channel of a wider bandwidth transmission (e.g. 80 MHz, 160 MHz, or 320 MHz). In some embodiments that transmit across a 320 MHz bandwidth, the first 160 MHz utilize a common PLCP header, first tail field, and pad field with each 20 MHz sub-channel, and a second 160 MHz of the 320 MHz transmission utilize a different PLCP header, first tail field, and pad field. Thus, scrambling the non-HT_PPDU of operation 810 includes scrambling, within each 20 MHz sub-channel, the PLCP header, first tail field, and pad field.

In operation 815, one or more tail fields are overwritten with zero values. Thus, in embodiments encoding a non-HT PPDU analogous to the PPDU discussed above with respect to FIG. 6B or FIG. 6C, operation 815 overwrites one or more of the first tail field (e.g. first tail field 616B, first tail field 616C, or first tail field 616D). In embodiments encoding a non-HT PPDU analogous to the PPDU discussed above with respect to FIG. 6D, operation 815 overwrites one or more of the first tail field 616E, second tail field 626E, first tail field 616F (in 320 MHz transmissions), or the second tail field 626F (also in 320 MHz transmissions). In embodiments encoding a PPDU analogous to the PPD of FIG. 6E, operation 815 overwrites the first tail field 616G and the second tail field 626G.

In operation 820, the non-HT PPDU is transmitted over a wireless medium or wireless network. In some embodiments, the non-HT PPDU is transmitted over an 80 MHz channel. The 80 MHz channel includes, in at least some embodiments, four non-overlapping 20 MHz sub-channels. As discussed above with respect to the preamble puncturing modes of second column 710 of FIG. 7 with an 80 MHz bandwidth, in some embodiments, the possible preamble puncturing modes include no preamble puncturing (e.g. "1111" of FIG. 7, second column 710), a first sub-channel of the four 20 MHz sub-channels is punctured (e.g. "x111" of second column 710), a second sub-channel of the four 20 MHz sub-channels is punctured (e.g. "1x11" of second column 710), a third sub-channel of the four 20 MHz sub-channels is punctured (e.g. "11x1" of second column 710), or a fourth sub-channel of the four 20 MHz sub-channels is punctured (e.g. "111x" of second column 710). Thus, in at least some embodiments, there are five preamble puncturing configurations. In some embodiments, an indication of one of these five preamble puncturing configurations is encoded in three bits of the pad field. Some embodiments encode a parity bit in the pad field. The parity bit is based on the three bits that encode the preamble puncturing configuration. In some embodiments, the parity bit is an even parity bit. Other embodiments do not include a parity bit. Thus, the encoded pad field includes zero or one parity bits, at least in some embodiments.

In some other embodiments, the non-HT_PPDU is transmitted over a 160 MHz channel. The 160 MHz channel includes, in at least some embodiments, eight 20 MHz sub-channels. In these embodiments, the preamble puncturing information identifies which contiguous pair of the eight 20 MHz sub-channels is punctured (e.g. such as the contiguous pairs of 20 MHz sub-channels illustrated in second column 710 of FIG. 7 with respect to the 160 MHz bandwidth), or which one 20 MHz sub-channel within the eight 20 MHz sub-channels is punctured or that no sub-channels are punctured.

In some other embodiments, the non-HT PPDU is transmitted over a 320 MHz bandwidth, thus transmitting a 320 MHz non-HT PPDU. The 320 MHz bandwidth indication is encoded in the First7BitsofTheScramblingSequence and the Service field in these embodiments. First preamble puncturing configuration information of a first of the two 160 MHz channels within the 320 MHz bandwidth is encoded in a pad field or first Service Field value within the first 160 MHz bandwidth of the 320 MHz bandwidth, while second preamble puncturing configuration of a second of the two 160 MHz channels of the 320 MHz bandwidth is encoded in a second pad field or second Service Field value within the second 160 MHz (e.g., when encoding the preamble puncturing information in one or more pad fields, the 320 MHz transmission described above is analogous to the PPDU 660, including the first portion 660A at 80 MHz or 160 MHz and the second portion 660B of 160 MHz In some embodiments, the first and second preamble puncturing configurations of the two 160 MHz channels each include up to seven predefined preamble puncturing configurations (e.g., as illustrated in the second column 710 of FIG. 7): unpunctured (1), lower or upper 80 MHz punctured (2), and 40 MHz out of 160 MHz punctured (4).

Thus, some embodiments of method 800 of FIG. 8 provide for insertion of bandwidth and/or preamble puncturing information into a PSDU before a scrambling process occurs. Since, in some embodiments, there are ten bits available in an uncoded pad field and the proposed second tail field within the pad field consumes six of those bits, bandwidth is signaled elsewhere (e.g., via First7BitsOfTheScramblingSequence and/or the Service field for 320 MHz) in these embodiments. This provides four bits for signaling preamble puncturing configuration information for an 80 MHz PPDU or a 160 MHz PPDU. In some embodiments, the Service field is used to signal the preamble puncturing configuration information for 320 MHz PPDUs (instead of or in addition to the four bits of the pad field). With an 80 MHz PPDU, there are, in some embodiments, one unpunctured and four punctured (e.g. five total) possible preamble puncturing configurations. With a 160 MHz PPDU, in some embodiments there are one punctured and twelve punctured (for a total of thirteen) possible preamble puncturing configurations. These preamble puncturing configurations can be signaled via the four available bits of the pad field. With 80 MHz PPDUs, an even parity bit is also optionally included. In this embodiment, the Service field and PSDU data bits are followed, by a Tail field (e.g., first tail field 616B), the four bits of preamble puncturing information (e.g., first preamble puncturing configuration information 622E), a parity bit (if present) (e.g., the zero or one parity bits 624E), a second six bit Tail field (e.g., second tail field 626E) and any residual pad bits (e.g., represented by the zero or more remaining pad bits 628E). This data is then scrambled. The scrambling results in a scrambled first tail field, a scrambled preamble puncturing configuration information, and a scrambled second tail field. The now scrambled two Tail fields (e.g. the first tail field 616E and the second tail field 626E) are then overwritten by zeros. This new bit stream is encoded and punctured, then interleaved.

Figure 9:
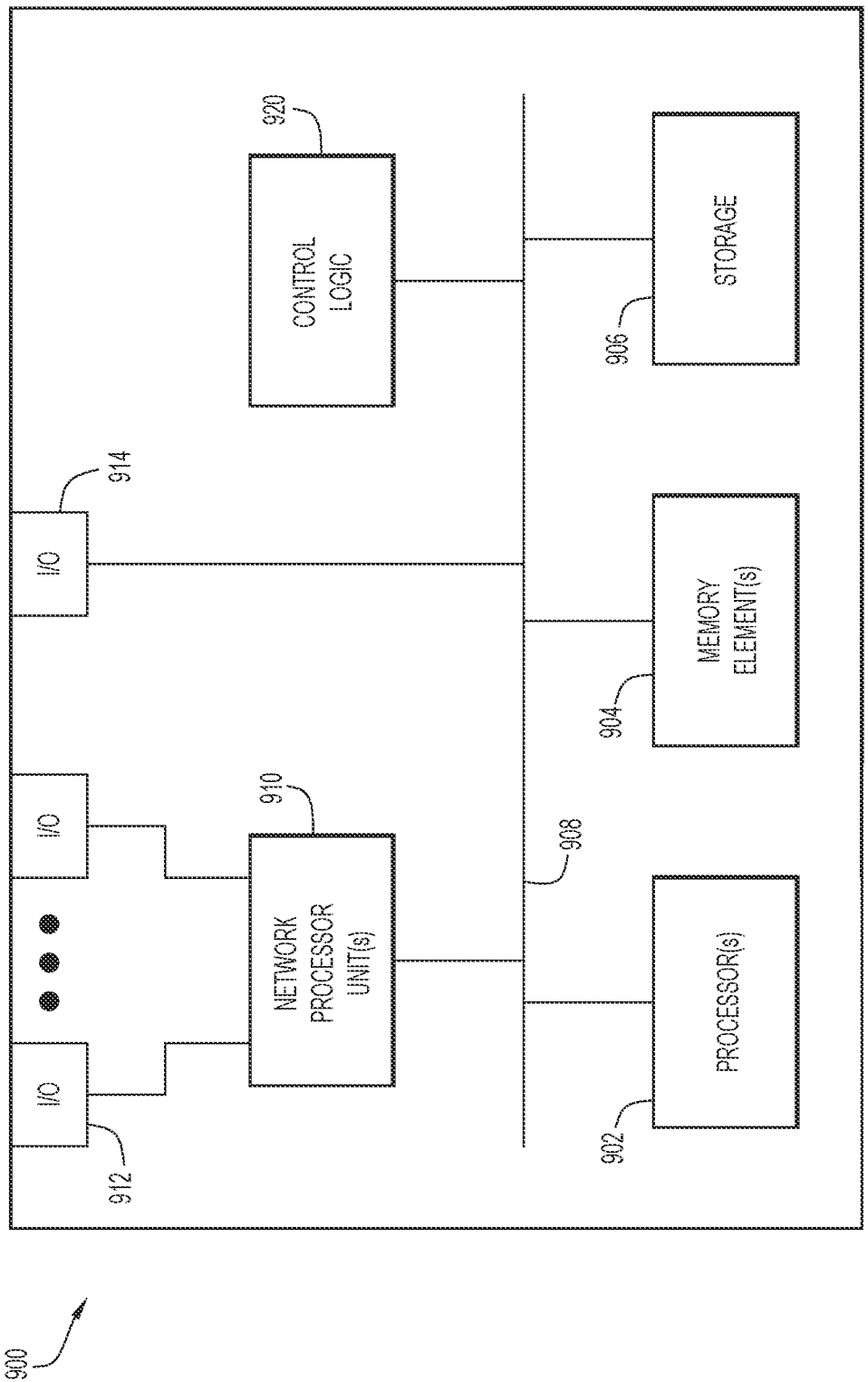
FIG. 9 is a block diagram of a device that may be configured to perform the signaling techniques presented herein, according to an example embodiment.

FIG. 9 illustrates a hardware block diagram of a computing device 900 that may perform functions associated with operations discussed herein in connection with the techniques depicted in FIGS. 1-8. In various embodiments, a computing device, such as computing device 900 or any combination of multiple computing devices of the computing device 900, may be configured as any device (e.g., AP 102 or wireless stations 104A-C of FIG. 1) as discussed for the techniques depicted in connection with FIGS. 1-8 in order to perform operations of the various techniques discussed herein.

In at least one embodiment, the computing device 900 may include one or more processor(s) 902, one or more memory element(s) 904, storage 906, a bus 908, one or more network processor unit(s) 910 interconnected with one or more network input/output (I/O) interface(s) 912, one or more I/O interface(s) 914, and control logic 920. In various embodiments, instructions associated with logic for computing device 900 can overlap in any manner and are not limited to the specific allocation of instructions and/or operations described herein.

In at least one embodiment, processor(s) 902 is/are at least one hardware processor configured to execute various tasks, operations and/or functions for computing device 900 as described herein according to software and/or instructions configured for computing device 900. Processor(s) 902 (e.g., a hardware processor) can execute any type of instructions associated with data to achieve the operations detailed herein. In one example, processor(s) 902 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 904 and/or storage 906 is/are configured to store data, information, software, and/or instructions associated with computing device 900, and/or logic configured for memory element(s) 904 and/or storage 906. For example, any logic described herein (e.g., control logic 920) can, in various embodiments, be stored for computing device 900 using any combination of memory element(s) 904 and/or storage 906. Note that in some embodiments, storage 906 can be consolidated with memory element(s) 904 (or vice versa), or can overlap/exist in any other suitable manner.

In at least one embodiment, bus 908 can be configured as an interface that enables one or more elements of computing device 900 to communicate in order to exchange information and/or data. Bus 908 can be implemented with any architecture designed for passing control, data and/or information between processors, memory elements/storage, peripheral devices, and/or any other hardware and/or software components that may be configured for computing device 900. In at least one embodiment, bus 908 may be implemented as a fast kernel-hosted interconnect, potentially using shared memory between processes (e.g., logic), which can enable efficient communication paths between the processes.

In various embodiments, network processor unit(s) 910 may enable communication between computing device 900 and other systems, entities, etc., via network I/O interface(s) 912 (wired and/or wireless) to facilitate operations discussed for various embodiments described herein. In various embodiments, network processor unit(s) 910 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications (wired and/or wireless) between computing device 900 and other systems, entities, etc. to facilitate operations for various embodiments described herein. In various embodiments, network I/O interface(s) 912 can be configured as one or more Ethernet port(s), Fibre Channel ports, any other I/O port(s), and/or antenna(s)/antenna array(s) now known or hereafter developed. Thus, the network processor unit(s) 910 and/or network I/O interface(s) 912 may include suitable interfaces for receiving, transmitting, and/or otherwise communicating data and/or information in a network environment.

I/O interface(s) 914 allow for input and output of data and/or information with other entities that may be connected to the computing device 900. For example, I/O interface(s) 914 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 920 can include instructions that, when executed, cause processor(s) 902 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 920) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 904 and/or storage 906 can store data, software, code, instructions (e.g., processor instructions), logic, parameters, combinations thereof, and/or the like used for operations described herein. This includes memory element(s) 904 and/or storage 906 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises encoding a non-high throughput (non-HT) physical layer convergence protocol (PLCP) protocol data unit (PPDU) to include a first Service Field, a payload field, a first tail field, and a pad field, the pad field or a first value of the first Service Field and a second value of a second Service Field of the non-HT PPDU encoded to indicate preamble puncturing configuration information, and transmitting the non-HT PPDU over a wireless network. In some embodiments, the method also includes encoding the preamble puncturing configuration information via both the pad field and the first value of the first Service Field. Some embodiments of the method include encoding a first parity value in the first Service Field based on a first portion of the preamble puncturing configuration information encoded in the first service field, and encoding, based on the first portion and a second portion of the preamble puncturing configuration information encoded in the pad field, a second parity value in the pad field.

In some embodiments of the method, the transmitting of the non-HT PPDU transmits the non-HT PPDU over an 80 MHz bandwidth, and the 80 MHz bandwidth comprises four 20 MHz sub-channels, and the preamble puncturing configuration information indicates one of no preamble puncturing, a first channel of the four 20 MHz sub-channels is punctured, a second channel of the four 20 MHz sub-channels is punctured, a third channel of the four 20 MHz sub-channels is punctured, or a fourth channel of the four 20 MHz sub-channels is punctured. Some embodiments of the method also include encoding an indication of the preamble puncturing configuration information within three bits of the pad field. Some embodiments further include determining a parity bit based on the three bits, and encoding the parity bit in the pad field. In some embodiments, the parity bit is an even parity bit. In some embodiments of the method, the transmitting of the non-HT PPDU transmits the non-HT PPDU over a 160 MHz bandwidth, and the 160 MHz bandwidth comprises eight 20 MHz sub-channels, and the preamble puncturing configuration information indicates one of no preamble puncturing, an indication identifying a contiguous pair of sub-channels that is punctured, or an indication identifying one of the eight 20 MHz sub-channels that is punctured. Some of these embodiments include encoding an indication of the preamble puncturing configuration information within four bits of the pad field.

In some embodiments of the method, the non-HT PPDU is transmitted over a 320 MHz bandwidth, and wherein the non-HT-PPDU includes two portions, a first portion transmitted over a first 160 MHz bandwidth of the 320 MHz bandwidth, and a second portion transmitted over a second 160 MHz bandwidth of the 320 MHz bandwidth, and wherein the second portion includes a second pad field, and the method further includes encoding a first preamble puncturing configuration of the first portion in the pad field, and encoding a second preamble puncturing configuration of the second portion in the second pad field. The transmitting includes transmitting the first portion over the first 160 MHz bandwidth, and transmitting the second portion over the second 160 MHz bandwidth.

In some embodiments of the method, the non-HT PPDU is transmitted over a 320 MHz bandwidth, and wherein the non-HT-PPDU includes two portions, a first portion transmitted over a first 160 MHz bandwidth of the 320 MHz bandwidth, and a second portion transmitted over a second 160 MHz bandwidth of the 320 MHz bandwidth, and wherein the second Service Field is within the second portion, and the method further includes encoding a first preamble puncturing configuration of the first portion in the first value of the first Service Field; and encoding a second preamble puncturing configuration of the second portion in the second value of the second Service Field. The transmitting includes transmitting the first portion over the first 160 MHz bandwidth, and transmitting the second portion over the second 160 MHz bandwidth.

In some embodiments of the method, the encoding the non-HT PPDU includes encoding the preamble puncturing configuration information in the pad field, encoding a second tail field in the pad field, scrambling the first tail field, the preamble puncturing configuration information, and the second tail field to generate a scrambled first tail field, a scrambled preamble puncturing configuration information, and a scrambled second tail field respectively; and overwriting the scrambled first tail field and the scrambled second tail field with zero values.

In another form, an apparatus is provided that comprises a network interface configured to enable network communications, one or more processors, and one or more memories storing instructions that when executed configure the one or more processors to perform operations comprising encoding a non-high throughput (non-HT) physical layer convergence protocol (PLCP) protocol data unit (PPDU) to include a first Service Field, a payload field, a first tail field, and a pad field, the pad field or a first value of the first Service Field and a second value of a second Service Field of the non-HT PPDU encoded to indicate preamble puncturing configuration information, and transmitting the non-HT PPDU over a wireless network.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method, comprising:
   encoding a non-high throughput (non-HT) physical layer convergence protocol (PLCP) protocol data unit (PPDU) to include a first Service Field, a payload field, a first tail field, and a pad field, the pad field or a first value of the first Service Field and a second value of a second Service Field of the non-HT PPDU encoded to indicate preamble puncturing configuration information;
   encoding a first parity value in the pad field based on the preamble puncturing configuration information encoded in the first Service field and the preamble puncturing configuration information encoded in the pad field; and transmitting the non-HT PPDU over a wireless network.

2. The method of claim 1, further comprising encoding the preamble puncturing configuration information via both the pad field and the first value of the first Service Field.

3. The method of claim 1, further comprising:
encoding a second parity value in the first Service Field based on a first portion of the preamble puncturing configuration information encoded in the first service field,
wherein encoding the first parity value in the pad field is based on the first portion and a second portion of the preamble puncturing configuration information encoded in the pad field.

4. The method of claim 1, wherein the transmitting of the non-HT PPDU transmits the non-HT PPDU over an 80 MHz bandwidth, and the 80 MHz bandwidth comprises four 20 MHz sub-channels, and wherein the preamble puncturing configuration information indicates one of no preamble puncturing, a first channel of the four 20 MHz sub-channels is punctured, a second channel of the four 20 MHz sub-channels is punctured, a third channel of the four 20 MHz sub-channels is punctured, or a fourth channel of the four 20 MHz sub-channels is punctured.

5. The method of claim 1, further comprising encoding an indication of the preamble puncturing configuration information within three bits of the pad field.

6. The method of claim 5, further comprising determining the first parity value as a parity bit based on the three bits.

7. The method of claim 6, wherein the parity bit is an even parity bit.

8. The method of claim 1, wherein the transmitting of the non-HT PPDU transmits the non-HT PPDU over a 160 MHz bandwidth, and the 160 MHz bandwidth comprises eight 20 MHz sub-channels, and wherein the preamble puncturing configuration information indicates one of no preamble puncturing, an indication identifying a contiguous pair of sub-channels that is punctured, or an indication identifying one of the eight 20 MHz sub-channels that is punctured.

9. The method of claim 8, further comprising encoding an indication of the preamble puncturing configuration information within four bits of the pad field.

10. The method of claim 1, wherein the non-HT PPDU is transmitted over a 320 MHz bandwidth, and wherein the non-HT-PPDU includes two portions, a first portion transmitted over a first 160 MHz bandwidth of the 320 MHz bandwidth, and a second portion transmitted over a second 160 MHz bandwidth of the 320 MHz bandwidth, and wherein the second portion includes a second pad field, and the method further comprises:
encoding a first preamble puncturing configuration of the first portion in the pad field; and
encoding a second preamble puncturing configuration of the second portion in the second pad field,
wherein the transmitting comprises:
transmitting the first portion over the first 160 MHz bandwidth, and
transmitting the second portion over the second 160 MHz bandwidth.

11. The method of claim 1, wherein the non-HT PPDU is transmitted over a 320 MHz bandwidth, and wherein the non-HT-PPDU includes two portions, a first portion transmitted over a first 160 MHz bandwidth of the 320 MHz bandwidth, and a second portion transmitted over a second 160 MHz bandwidth of the 320 MHz bandwidth, and wherein the second Service Field is within the second portion, and the method further comprises:
encoding a first preamble puncturing configuration of the first portion in the first value of the first Service Field; and
encoding a second preamble puncturing configuration of the second portion in the second value of the second Service Field,
wherein the transmitting comprises:
transmitting the first portion over the first 160 MHz bandwidth, and
transmitting the second portion over the second 160 MHz bandwidth.

12. The method of claim 1, wherein encoding the non-HT PPDU comprises:
encoding the preamble puncturing configuration information in the pad field;
encoding a second tail field in the pad field;
scrambling the first tail field, the preamble puncturing configuration information, and the second tail field to generate a scrambled first tail field, a scrambled preamble puncturing configuration information, and a scrambled second tail field respectively; and
overwriting the scrambled first tail field and the scrambled second tail field with zero values.

13. An apparatus, comprising:
a network interface configured to enable network communications;
one or more processors; and
one or more memories storing instructions that when executed configure the one or more processors to perform operations comprising:
encoding a non-high throughput (non-HT) physical layer convergence protocol (PLCP) protocol data unit (PPDU) to include a first Service Field, a payload field, a first tail field, and a pad field, the pad field or a first value of the first Service Field and a second value of a second Service Field of the non-HT PPDU encoded to indicate preamble puncturing configuration information;
encoding a first parity value in the pad field based on the preamble puncturing configuration information encoded in the first Service field and the preamble puncturing configuration information encoded in the pad field; and
transmitting the non-HT PPDU over a wireless network.

14. The apparatus of claim 13, the operations further comprising encoding the preamble puncturing configuration information via both the pad field and the first value of the first Service Field.

15. The apparatus of claim 13, the operations further comprising:
encoding a second parity value in the first Service Field based on a first portion of the preamble puncturing configuration information encoded in the first service field,
wherein encoding the first parity value in the pad field is based on the first portion and a second portion of the preamble puncturing configuration information encoded in the pad field.

16. The apparatus of claim 13, wherein the non-HT PPDU is transmitted over a 320 MHz bandwidth, and wherein the non-HT-PPDU includes two portions, a first portion transmitted over a first 160 MHz bandwidth of the 320 MHz bandwidth, and a second portion transmitted over a second 160 MHz bandwidth of the 320 MHz bandwidth, and wherein the second portion includes a second pad field, and the operations further comprise:
  encoding a first preamble puncturing configuration of the first portion in the pad field; and
  encoding a second preamble puncturing configuration of the second portion in the second pad field,
  wherein the transmitting comprises:
    transmitting the first portion over the first 160 MHz bandwidth, and
    transmitting the second portion over the second 160 MHz bandwidth.

17. The apparatus of claim 13, wherein the non-HT PPDU is transmitted over a 320 MHz bandwidth, and wherein the non-HT-PPDU includes two portions, a first portion transmitted over a first 160 MHz bandwidth of the 320 MHz bandwidth, and a second portion transmitted over a second 160 MHz bandwidth of the 320 MHz bandwidth, and wherein the second Service Field is within the second portion, and the operations further comprise:
  encoding a first preamble puncturing configuration of the first portion in the first value of the first Service Field; and
  encoding a second preamble puncturing configuration of the second portion in the second value of the second Service Field,
  wherein the transmitting comprises:
    transmitting the first portion over the first 160 MHz bandwidth, and
    transmitting the second portion over the second 160 MHz bandwidth.

18. A non-transitory computer readable storage medium comprising instructions that when executed configure one or more processors to perform operations comprising:
  encoding a non-high throughput (non-HT) physical layer convergence protocol (PLCP) protocol data unit (PPDU) to include a first Service Field, a payload field, a first tail field, and a pad field, the pad field or a first value of the first Service Field and a second value of a second Service Field of the non-HT PPDU encoded to indicate preamble puncturing configuration information;
  encoding a first parity value in the pad field based on the preamble puncturing configuration information encoded in the first Service field and the preamble puncturing configuration information encoded in the pad field; and
  transmitting the non-HT PPDU over a wireless network.

19. The non-transitory computer readable storage medium of claim 18, the operations further comprising encoding the preamble puncturing configuration information via both the pad field and the first value of the first Service Field.

20. The non-transitory computer readable storage medium of claim 18, the operations further comprising:
  encoding a second parity value in the first Service Field based on a first portion of the preamble puncturing configuration information encoded in the first service field,
  wherein encoding the first parity value in the pad field is based on the first portion and a second portion of the preamble puncturing configuration information encoded in the pad field.

* * * * *